United States Patent [19]

Margotte

[11] 4,336,348

[45] Jun. 22, 1982

[54] THERMOPLASTIC COMPOSITIONS, PROCESS FOR THEIR PREPARATION AND THEIR USE

[75] Inventor: Dieter Margotte, Krefeld, Fed. Rep. of Germany

[73] Assignee: Bayer Aktiengesellschaft, Leverkusen, Fed. Rep. of Germany

[21] Appl. No.: 115,180

[22] Filed: Jan. 25, 1980

[30] Foreign Application Priority Data

Feb. 8, 1979 [DE] Fed. Rep. of Germany ....... 2904832

[51] Int. Cl.³ .............................................. C08L 69/00
[52] U.S. Cl. ................... 525/146; 525/148; 525/390; 525/391; 525/437; 525/445
[58] Field of Search ............. 525/146, 148, 390, 391, 525/394, 397, 461, 466, 437, 445; 260/29.2 E, 29.7 NR, 29.6 NR, 33.8 R, 33.8 UA

[56] References Cited

U.S. PATENT DOCUMENTS

| | | | |
|---|---|---|---|
| 3,000,849 | 9/1961 | Clachan et al. | 260/45.4 |
| 3,143,525 | 8/1964 | Ott | 525/146 |

FOREIGN PATENT DOCUMENTS

| | | | |
|---|---|---|---|
| 2218 | 6/1979 | European Pat. Off. | 525/146 |
| 1420232 | 2/1969 | Fed. Rep. of Germany | 525/146 |
| 1745695 | 7/1970 | Fed. Rep. of Germany | 525/146 |
| 1794053 | 4/1972 | Fed. Rep. of Germany | 525/146 |
| 1245852 | 9/1971 | United Kingdom | 525/146 |

*Primary Examiner*—J. Ziegler
*Attorney, Agent, or Firm*—Gene Harsh; Lawrence S. Pope; Aron Preis

[57] ABSTRACT

This disclosure is concerned with an improved process for preparing polymer blends by synthesizing a polyester by the phase boundary condensation synthesis wherein a preformed polymer is dissolved in the organic solvent phase of the synthesis system. This polymer is inert to the diphenol acid chloride and alkali used to form the polyester and differs from this polyester by at least molecular weight and may differ from it in chemical identity. This disclosure is also concerned with the polymer blends so obtained which display superior properties to those obtained by physically blending two already formed polymers.

12 Claims, No Drawings

THERMOPLASTIC COMPOSITIONS, PROCESS FOR THEIR PREPARATION AND THEIR USE

FIELD OF THE INVENTION

The present invention relates to a process for the preparation of polyesters, especially polycarbonates based on diphenols and bis-acid halides, optionally with the additional use of chain stoppers and, optionally, chain branching agents, by the known method of the phase boundary process, comprising an aqueous alkaline phase and an inert organic phase, which is characterized in that the phase boundary process is carried out in the presence of a polymeric compound which is dissolved in the organic phase and is inert under the conditions of the phase boundary process.

The present invention also relates to the polymeric products obtainable according to the invention.

BACKGROUND OF THE INVENTION

Polymeric blends are generally prepared by melting and mixing in mixing extruders or kneaders. The known techniques also include dissolving the polymer components together in a solvent and devolatilizing together in devolatilizing extruders.

One of the main disadvantages of many known blend systems is that, in addition to the desired improvements in the characteristics, negative influences are also discernible which are due to a more or less pronounced incompatibility of the polymer components with one another. In general, it is observed that the mechanical properties are less good than the properties theoretically to be expected (determined arithmetically).

There has been no lack of attempts hitherto to improve the compatibility of polymer blends. However, in most cases chemical modifications have been chosen for this purpose. Thus, for example, it has been attempted to improve the compatibility of polycarbonate with vinyl polymers by a free radical grafting reaction of, for example, styrene onto an unmodified polycarbonate (see British Patent Specification No. 1,245,852 and onto a polycarbonate containing allyl groups (see U.S. Pat. No. 3,692,870). An improvement in the compatibility of polycarbonate with other vinyl polymers has also been achieved by polycondensation of polycarbonate with an aliphatic vinyl polymer containing OH groups (U.S. Pat. No. 3,461,187) or with an aromatic vinyl polymer containing OH groups (see U.S. Pat. No. 3,687,895). Additives such as, for example, block polymers or graft polymers, which are compatible with both of the two polymer phases (so-called compatibility promoters) have also already been proposed for improving the compatibility of polymers which in themselves are incompatible (G. Riess, J. Kohler, C. Tournut and A. Banderet. Makromolekulare Chemie 101 (1967), pages 58–73 and L. Bohn, Kolloid Zeitschrift und Zeitschrift für Polymere, Volume 213, Number 1–2, pages 55–67).

SUMMARY OF THE INVENTION

It has now been found, surprisingly, that the compatibility of a polycondensation product A, which can be prepared by a polycondensation reaction, with a polymeric compound B can also be considerably improved without chemical modification and without the use of compatibility promoters by carrying out the polycondensation reaction for the preparation of polycondensation product A in the presence of the polymeric compound B.

The process according to the invention is carried out analogously to the known phase boundary process for the preparation of aromatic polycarbonates. This process is described in detail in, for example, "Kunststoff-Handbuch" ("Plastics Handbook"), Volume VIII, page 12 et seq. and in "Chemistry and Physics of Polycarbonates", Polymer Reviews, Volume 9, page 33 et seq.

In general, the procedure is to react the diphenols, and optionally chain stoppers and optionally chain branching agents, which are dissolved in an aqueous alkaline solution, with bis-acid halides, expecially bis-acid chlorides, in the presence of an organic solvent (such as methylene chloride, chlorobenzene or mixtures thereof) in which the polymeric compound B is dissolved. The condensation reaction is effected by the process described in the literature cited above, by the addition of aliphatic tertiary amines, such as triethylamine or N-ethylpiperidine.

The process can be carried out in the known apparatuses, in one or two stages, and continuously or discontinuously, at pH values of about 8–13 and temperatures of about 0°–80° C. under the known conditions.

DETAILED DESCRIPTION OF THE INVENTION

Suitable diphenols for carrying out the process according to the invention are, for example: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)ethers, bis-(hydroxyphenyl)-sulphoxides, bis-(hydroxyphenyl)-sulphones, bis-(hydroxyphenyl)-ketones, α,α-bis-(hydroxyphenyl)-diisopropylbenzenes and the derivatives thereof which are alkylated in the nucleus or halogenated in the nucleus.

These and further suitable diphenols are described, for example, in U.S. Pat. Nos. 3,028,365; 2,999,835; 3,148,172; 3,271,368; 2,991,273; 3,271,367; 3,280,078; 3,014,891 and 2,999,846, all incorporated herein by reference; in German Offenlegungsschriften (German Published Specifications) Nos. 1,570,703; 2,063,050; 2,063,052; 2,211,956 and 2,211,957; in French Patent Specification No. 1,561,518 and in the monograph by H. Schnell, "Chemistry and Physics of Polycarbonates", Interscience Publishers, New York, 1964.

Examples of preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Examples of suitable bis-acid chlorides are those of the general formula

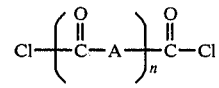

in which
n is 0 or 1 and
A denotes a $C_6$–$C_{20}$ arylene radical, a $C_6$–$C_{20}$-arylene dioxy radical, a $C_1$–$C_{10}$-alkylene radical or a single bond.

Preferred acid chlorides are: phosgene, oxalic acid dichloride, malonic acid dichloride, butyric acid dichloride, glutaric acid dichloride, suberic acid dichloride, pimelic acid dichloride, phthalic acid dichloride, isophthalic acid dichloride and terephthalic acid dichloride.

Suitable chain stoppers are the phenolic compounds which are customarily known from the preparation of aromatic polycarbonates, such as, for example, phenol itself or alkylphenols, such as p-tert.-butylphenol or p-cresol, or halogenophenols, such as, for example, p-chlorophenol or p-bromo-phenol.

The chain branching agents used are the compounds which have more than two functional groups reactive under the conditions of the phase boundary polycondensation reaction, which are customarily known from the preparation of branched aromatic polycarbonates, that is to say, for example, compounds with three or more than three phenolic hydroxyl groups, such as 1,3,5-tri-(4-hydroxyphenol)-benzene, tri-(4-hydroxyphenyl)-phenylmethane or 1,4-bis-((4',4''-dihydroxytriphenyl)-methyl)-benzene. Other suitable compounds with more than two functional groups are, for example, trimesic acid trichloride, cyanuric chloride and 3,3-bis-(4-hydroxy-3-methyl-phenyl)-2-oxo-2,4-dihydroindole.

The starting compounds for carrying out the phase boundary process according to the invention in the presence of a polymeric compound B are proportioned in the same way as if polycarbonates, polycarboxylic acid esters or polycarboxylic acid ester-polycarbonates based on diphenols and bis-acid chlorides, that is to say compounds which have carbonic acid ester structures and carboxylic acid ester structures in the chain, arranged in any other, either statistically or in segments, and average weight-average molecular weights $M_n$ of about 20,000 to 200,000 (determined by means of light scattering by known methods in chloroform) were to be prepared in a known manner.

This applies not only with regard to the particular amount of acid halides to be employed but also with regard to the amount of chain stopper optionally to be employed, the amount of catalyst and the reaction time and reaction temperature to be chosen.

Polymeric compounds B which are suitable according to the present invention are those which are soluble in the solvent employed as the organic phase in the process according to the invention. Polymeric compounds B of this type are, for example:

all vinyl polymers prepared by free radical polymerization which have weight-average molecular weights of $M_w = 150,000$ to 350,000 (measured by light scattering in chloroform), polysulphones with weight-average molecular weights $M_w$ (measured by light scattering in chloroform) of between 1,000 and 200,000 and preferably of between 20,000 and 60,000;

polyaryl ether-sulphones which are prepared by reacting with one another approximately equimolar amounts of at least one aromatic di-alkali-bis-hydroxylate and at least one bis-(4-halogenoaryl) compound, the aryl nuclei of which are bonded by at least one sulphonyl group, optionally with the additional use of about 0.01 mol % to about 2 mol %, preferably of about 0.05 mol % to about 1.5 mol %, based on the bis-hydroxylate or on the bis-halogenoaryl compound, of at least one branching agent, that is to say, an alkali metal salt of an aromatic compound, containing three or more than three hydroxyl groups, and/or of a halogenoaryl compound with three or more than three aryl-bonded halogen substituents which are replaceable under the reaction conditions for the preparation of the polyaryl ethersulphone;

poly-(2,6-dialkyl-1,4-phenyl oxides) which have weight-average molecular weights of 2,000 to 100,000 and preferably of between 20,000 and 60,000 and which are obtained according to known processes by an oxidative condensation reaction of 2,6-dialkylphenols with oxygen in the presence of combination catalysts consisting of copper salts and tertiary amines (see, for example, DT-OS (German Published Specification) No. 2,126,434 and U.S. Pat. No. 3,306,875, incorporated herein by reference), polybutadienes with weight-average molecular weights (measured by light scattering in chloroform) of 1,000 to 200,000 and preferably of 80,000 to 150,000 and polycarbonates with weight-average molecular weights of 1,000 to 200,000 and preferably 10,000 to 40,000 (measured by light scattering in chloroform).

Preferred polymeric compounds B are polystyrene (for example, polystyrene 168 N, available from BASF), styrene/acrylonitrile copolymers (such as Luran 368 R, available from BASF), rubber-modified styrene/acrylonitrile copolymers (such as Luran S, available from BASF), polymethyl methacrylate (such as Plexigum 7 H, available from Rohm), polysulphones (such as Udel, available from UCC), and polycarbonates based on aromatic dihydroxy compounds.

In the process according to the invention, the polymeric compounds B are in each case employed, in the solvent which is suitable for the polycondensation reaction, in amounts such that, after the polycondensation reaction has taken place, they are present in the end product in an amount by weight which is between 5 and 60 and preferably between 10 and 40% by weight, based on the total weight of polymeric end product. The amounts of solvent required for the process according to the invention should in each case be calculated so that, after the phase boundary polycondensation reaction has ended, the concentration of end product is between about 5 and about 15% by weight, based on end product and solvent.

A special process variant for those polymeric compounds B which are prepared in a solvent suitable for the process of the present invention is that these compounds can be used immediately after their preparation, without isolation, for the process according to the invention.

A particular process variant, moreover, consists in using, as the polymeric compound B, the same products as are to be prepared by the phase boundary process according to the invention. The possibility offered by a procedure of this type is that polycondensation products can also be combined with one another by the process according to the invention and that polymeric end products with a bimodal or polymodal distribution function of the molecular weights are obtainable. Thus, for example, it is possible, by the process according to the invention, to synthesize a second polycarbonate with a weight-average molecular weight of about 70,000 in the presence of a polycarbonate with a weight-average molecular weight of about 25,000, which is dissolved in methylene chloride, this second polycarbonate forming, together with the polycarbonate initially introduced, a polymeric end product with a bimodal distribution function of the molecular weights.

Compared with the mixtures prepared by conventional methods, the polymeric products obtainable according to the invention are distinguished by distinctly improved mechanical properties.

The polymeric products obtainable according to the invention should have relative solution viscosities (measured in methylene chloride at 25° C. and a concentration of 5 g/l) of between about 1.25 and 1.60 and preferably of between about 1.35 and 1.50.

The polymeric products obtainable according to the invention can be processed by conventional methods to shaped articles and in particular also to films, known additives, such as, for example, heat stabilizers, UV stabilizers and flameproofing agents and also reinforcing fillers, such as, for example, glass fibers or asbestos, can be admixed with the products.

The products can be used wherever the components on which they are based, or the conventional mixtures thereof, have been employed hitherto, that is to say in automobile construction as steering column sheathing and as dashboards and radiator grills or in the household sector for the production of coffee machines, egg boilers, filter cups and the like and in the electrical field as loudspeaker housings.

The subject of the invention will be illustrated in more detail with the aid of the Examples which follow. The relative solution viscosities quoted are measured as indicated above.

EXAMPLES

EXAMPLE 1

(Polymer blend of polycarbonate-styrene/acrylonitrile copolymer)

The preparation of a polycarbonate based on 4,4'-dihydroxy-2,2-diphenylpropane (bisphenol A) in the presence of a styrene/acrylonitrile copolymer (Luran 368 R, BASF) will be described as an example of the polycondensation reaction.

456 g (2 mols) of bisphenol A and 9.5 g (0.063 mol) of p-tert.-butyl-phenol are suspended in 1.5 l of water. The oxygen is removed from the reaction mixture in a three-necked flask, fitted with a stirrer and a gas inlet tube, by passing nitrogen through the reaction mixture for fifteen mixtures, while stirring. 355 g of 45% strength sodium hydroxide solution and a solution of 218 g of a SAN copolymer (Luran 368 R, BASF, $\eta_{rel}$=1.62) in 6,500 g of methylene chloride are then added.

The mixture is cooled to 25° C. While maintaining this temperature by cooling, 237 g of phosgene are added over a period of 120 minutes. An additional amount of 150 g of a 45% strength sodium hydroxide solution is added after 15–30 minutes, after the absorption of phosgene has started. 1.6 g of triethylamine are added to the resulting solution and the mixture is stirred for a further fifteen minutes. A highly viscous solution is obtained and the viscosity of this solution is regulated by adding methylene chloride. The aqueous phase is separated off. The organic phase is washed with water until salt-free and alkali-free. The polymer blend which has formed after evaporating off the solvent has a relative solution viscosity of 1.40.

The relative viscosity is measured in methylene chloride at 25° C. and a concentration of 5 g/l.

COMPARISON EXAMPLE 1a

In a comparison Example, 70 parts by weight of a polycarbonate based on bisphenol A and having a relative solution viscosity of 1.30 were mixed together and granulated with 30 parts by weight of Luran 368 R in a size 32 twin-screw extruder at 280° C. The relative solution viscosity was 1.38. Some characteristic properties are listed in the table which follows:

| Mechanical properties | Test method according to Din | Measurement unit | Polymer Example 1 | End product Example 1a |
|---|---|---|---|---|
| $\eta$ rel. | | | 1.40 | 1.38 |
| Vicat B | 53,460 | °C. | 131 | 126 |
| Notched impact strength | 53,453 | kJ/m² | 15 | 7 |
| Impact strength | 53,453 | kJ/m² | n.br.* | n.br. |
| Modulus of elasticity | 53,457 | MPa | 2,510 | 2,680 |
| Weld strength | 53,453** | kJ/m² | 6 | 2 |

*n.br. = not broken
**based on DIN 53,453.

The test sample is injection-molded using two gates on opposite sides and the impact strength is tested according to DIN 53,453.

EXAMPLE 2

(Blend of polycarbonate/polysulphone)

20 parts by weight of a polycarbonate based on bisphenol A with 1.3 mol % of p-tert.-butyl-phenol are prepared by the process described in Example 1 in the presence of 80 parts by weight of a polysulphone (Udel 3500, UCC, $\eta_{rel}$=1.26).

COMPARISON EXAMPLE 2a

In a comparison Example, 20% by weight of a polycarbonate based on bisphenol A and having a relative solution viscosity of 1.75 were mixed and granulated with 80% by weight of a polysulphone (Udel 3500, UCC, $\eta_{rel}$=1.26) in a ZSK twin-screw extruder at 340° C.

In comparison with a mixture prepared by means of extrusion, the polymer blend according to the invention shows a distinct improvement in the stress cracking resistance, measured after storing an extruded film for ten seconds in a solvent mixture consisting of three parts of n-propanol and one part of toluene. After storage, the residual elongation is determined according to DIN 53,504.

The individual values can be taken from the table which follows:

| | Initial elongation | | Residual elongation after storing for ten seconds in toluene/n-propanol: 1:3 | |
|---|---|---|---|---|
| | Example 2 | Example 2a | Example 2 | Example 2a |
| $\eta_{rel}$ | 1.38 | 1.36 | — | — |
| Elongation % | 100 | 105 | 90 | 50 |
| Tensile strength MPa | 90 | 85 | 80 | 45 |

EXAMPLE 3

(Blend of polycarbonates of differing molecular weight)

85 parts by weight of a polycarbonate based on bisphenol A with 3.1 mol % of p-tert.-butyl-phenol are prepared in the presence of 15 parts by weight of a polycarbonate based on bisphenol A and having a relative solution viscosity of 1.75.

COMPARISON EXAMPLE 3a 85 parts by weight of a polycarbonate based on bisphenol A and having a relative solution viscosity of 1.32 are dissolved in methylene chloride, together with 15 parts by weight of a polycarbonate based on bisphenol A and having a relative solution viscosity of 1.75 and the product is isolated by means of a devolatilizing extruder. The stress cracking resistance compared with that of the polymer blend according to the invention can be taken from the table which follows:

|  | Initial elongation | | Residual elongation after storing for ten seconds in toluene/n-propanol: 1:3 | |
|---|---|---|---|---|
|  | Example 3 | Example 3a | Example 3 | Example 3a |
| $\eta_{rel}$ | 1.42 | 1.40 | — | — |
| Elongation % | 120 | 120 | 110 | 75 |
| Tensile strength MPa | 85 | 80 | 80 | 55 |

EXAMPLE 4

(Blend of polycarbonate/polymethyl methacrylate)

60 parts by weight of a polycarbonate based on bisphenol A with 3.5 mol % of p-tert.-butyl-phenol are prepared analogously to Example 1 in the presence of 40 parts by weight of a polymethyl methacrylate having a relative solution viscosity of 1.58. The relative solution viscosity of the polymeric end product is 1.43.

EXAMPLE 5

(Blend of polycarbonate/poly-(2,6-dimethyl-1,4-phenylene oxide)

90 parts by weight of a polycarbonate based on bisphenol A with 3.1 mol % of p-tert.-butyl-phenol are prepared analogously to Example 1 in the presence of ten parts by weight of a poly-(2,6-dimethyl-1,4-phenylene oxide) having a relative solution viscosity of 1.27. The relative solution viscosity of the polymeric end product is 1.28.

EXAMPLE 6

(Blend of aromatic polyester/styrene-acrylonitrile copolyer)

1,824 g (8 mols) of bisphenol A are dissolved together with 21.6 g (0.14 mol) of p-tert.-butyl-phenol in 1,475 g (16.6 mols) of 45% strength sodium hydroxide solution. A solution of 716 g of a styrene/acrylonitrile copolymer (Luran 368, R BASF, $\eta_{rel}=1.62$) in 25.7 kg of methylene chloride is then added. A solution of 812 g (4 mols) of isophthalic acid dichloride and 812 g (4 mols) of terephthalic acid dichloride dissolved in 6,500 g of methylene chloride is then added dropwise at room temperature in the course of 15 minutes. After the reaction has ended, the emulsion is separated and the organic phase is washed with phosphoric acid and then with water until neutral. The end product has a relative solution viscosity of 1.41.

COMPARISON EXAMPLE 6a 8,000 g of an aromatic polyester prepared according to Example 6 (without the presence of a styrene/acrylonitrile copolymer) and having a relative solution viscosity of 1.36 are homogenized and granulated with 200 g of a styrene/acrylonitrile copolymer (Luran 368 R, BASF $\eta_{rel}=1.62$) in a size 32 twin-screw extruder at 300° C. The compound has a relative solution viscosity of 1.41. Some mechanical properties are listed in the table which follows:

| Mechanical properties | Test method according to DIN | Measurement unit | Polymer Example 6 | End product Example 6a |
|---|---|---|---|---|
| $\eta_{rel}$ | | | 1.42 | 1.41 |
| Impact strength | 53,453 | kJ/m$^2$ | 68 | 52 |
| Notched impact strength | 53,453 | kJ/m$^2$ | 7 | 3 |
| Vicat B | 53,460 | °C. | 156 | 142 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyester based on a diphenol and a bis-acid halide by the phase boundary process, comprising an aqueous alkaline phase and an inert organic phase, in which the phase boundary process is carried out in the presence of a polymeric compound which is dissolved only in the organic phase and is inert under the conditions of the phase boundary process.

2. The process according to claim 1 wherein an agent selected from the group consisting of chain stoppers, branching agents and mixtures thereof are used.

3. A process according to claim 1 or 2 in which the polymeric compound which is dissolved in the organic phase and is inert under the reaction conditions is selected from the group consisting of vinyl polymers, polyaryl ether sulphones, poly-(2,6-dialkyl-1,4-phenyl oxides) and polycarbonates.

4. The process according to claim 1 or 2 in which the polyester produced is a polycarbonate.

5. The process according to claim 1 or 2 wherein said polymeric compound is selected from the group consisting of polystyrenes, styrene acrylonitrile copolymers, rubber modified styrene acrylonitrile copolymers and polymethyl methacrylates.

6. A polyester mixture produced according to the process of claim 1 or 2.

7. A polyester mixture produced according to the process of claim 4.

8. A process for the production of a polyester based on a diphenol and a bis-acid halide by the phase boundary process, comprising an aqueous alkaline phase and an inert organic phase, in which the phase boundary process is carried out in the presence of between 10 and 40 percent of a polymeric compound which is dissolved only in the organic phase and is inert under the conditions of the phase boundary process, said percentages relative to the weight of said polyester.

9. A process for the production of a polyester based on a diphenol and bis-acid halide by the phase boundary process, comprising an aqueous alkaline phase and an inert organic phase, in which the phase boundary process is carried out in the presence of a polymeric compound selected from the group consisting of vinyl polymers having a weight average molecular weight of 150,000–350,000, polysulphones having a weight average molecular weight of 1,000 to 200,000, polyaryl ether-sulphones, poly-(2,6-dialkyl-1,4-phenyl oxides) having a weight average molecular weight of 2,000 to 100,000 and polycarbonates having a weight average molecular weight of 1,000 to 200,000 which is dissolved only in the organic phase and is inert under the conditions of the phase boundary process.

10. The process according to claim 3 wherein said vinyl polymers are polybutadienes.

11. A process for the production of a polyester based on a diphenol and a bis-acid halide by the phase boundary process, comprising an aqueous alkaline phase and an inert organic phase, in which the phase boundary process is carried out in the presence of polybutadiene having a weight average molecular weight of 1,000 to 200,000 which is dissolved only in the organic phase and is inert under the conditions of the phase boundary process.

12. A polyester mixture produced according to claim 9 or 11.

* * * * *